United States Patent
Li et al.

(10) Patent No.: US 12,417,047 B2
(45) Date of Patent: Sep. 16, 2025

(54) HETEROGENEOUS ML ACCELERATOR CLUSTER WITH FLEXIBLE SYSTEM RESOURCE BALANCE

(71) Applicant: Google LLC, Mountain View, CA (US)

(72) Inventors: Sheng Li, Cupertino, CA (US); Sridhar Lakshmanamurthy, Sunnyvale, CA (US); Norman Paul Jouppi, Palo Alto, CA (US); Martin Guy Dixon, Portland, OR (US); Daniel Stodolsky, Cambridge, MA (US); Quoc V. Le, Sunnyvale, CA (US); Liqun Cheng, Palo Alto, CA (US); Erik Karl Norden, San Jose, CA (US); Parthasarathy Ranganathan, San Jose, CA (US)

(73) Assignee: Google LLC, Mountain View, CA (US)

( * ) Notice: Subject to any disclaimer, the term of this patent is extended or adjusted under 35 U.S.C. 154(b) by 64 days.

(21) Appl. No.: 18/152,428

(22) Filed: Jan. 10, 2023

(65) Prior Publication Data

US 2024/0231667 A1    Jul. 11, 2024

(51) Int. Cl.
  *G06F 3/06*    (2006.01)
(52) U.S. Cl.
  CPC .......... *G06F 3/0647* (2013.01); *G06F 3/0611* (2013.01); *G06F 3/067* (2013.01)
(58) Field of Classification Search
  CPC ....... G06F 3/0647; G06F 3/0611; G06F 3/067
  See application file for complete search history.

(56) References Cited

U.S. PATENT DOCUMENTS

| | | |
|---|---|---|
| 10,180,928 B2 | 1/2019 | Nurvitadhi et al. |
| 10,474,600 B2 | 11/2019 | Malladi et al. |
| 10,608,638 B2 | 3/2020 | Lee et al. |
| 11,157,806 B2 | 10/2021 | Lie et al. |
| 11,423,254 B2 | 8/2022 | Prakash et al. |

(Continued)

FOREIGN PATENT DOCUMENTS

| | | |
|---|---|---|
| JP | 2021082285 A | 5/2021 |
| JP | 2021082289 A | 5/2021 |
| JP | 2022130363 A | 9/2022 |

OTHER PUBLICATIONS

Kommareddy, Vamsee Reddy, et al. "Prefam: Understanding the impact of prefetching in fabric-attached memory architectures." Proceedings of the International Symposium on Memory Systems. 2020. (Year: 2020).*

(Continued)

*Primary Examiner* — Francisco A Grullon
(74) *Attorney, Agent, or Firm* — Lerner David LLP (57) ABSTRACT

Aspects of the disclosure are directed to a heterogeneous machine learning accelerator system with compute and memory nodes connected by high speed chip-to-chip interconnects. While existing remote/disaggregated memory may require memory expansion via remote processing units, aspects of the disclosure add memory nodes into machine learning accelerator clusters via the chip-to-chip interconnects without needing assistance from remote processing units to achieve higher performance, simpler software stack, and/or lower cost. The memory nodes may support prefetch and intelligent compression to enable the use of low cost memory without performance degradation.

20 Claims, 7 Drawing Sheets

(56) References Cited

U.S. PATENT DOCUMENTS

| | | | |
|---|---|---|---|
| 2011/0035555 A1 | 2/2011 | Wang et al. | |
| 2018/0157729 A1* | 6/2018 | Lee | H04L 67/1029 |
| 2018/0176324 A1* | 6/2018 | Kumar | H04L 67/10 |
| 2019/0228308 A1* | 7/2019 | Zhou | G06N 20/00 |
| 2019/0361811 A1* | 11/2019 | Saeki | G06N 7/00 |
| 2020/0117999 A1 | 4/2020 | Yoon et al. | |
| 2021/0142167 A1 | 5/2021 | Lie et al. | |
| 2021/0149680 A1 | 5/2021 | Hughes et al. | |
| 2021/0149729 A1* | 5/2021 | Wang | G06N 20/00 |
| 2021/0194821 A1 | 6/2021 | Guim Bernat et al. | |
| 2022/0083230 A1* | 3/2022 | Tiotantra | G06F 3/0685 |
| 2022/0197773 A1 | 6/2022 | Butler et al. | |
| 2024/0020173 A1* | 1/2024 | Chatterjee | G06F 9/5072 |
| 2024/0176759 A1* | 5/2024 | An | G06F 15/80 |

OTHER PUBLICATIONS

Zhang, Zhao, et al. "Efficient i/o for neural network training with compressed data." 2020 IEEE International Parallel and Distributed Processing Symposium (IPDPS). IEEE, 2020. (Year: 2020).*

International Search Report and Written Opinion for International Application No. PCT/US2023/021101 dated Oct. 6, 2023. 15 pages.

Kommareddy et al. PreFAM: Understanding the Impact of Prefetching in Fabric-Attached Memory Architectures. Proceedings of the 31st Australian Conference on Human-Computer-Interaction, ACM Pub27, New York, NY, USA, Sep. 28, 2020 (Sep. 28, 2020), pp. 323-334.

Jouppi et al. A Domain-Specific Supercomputer for Training Deep Neural Networks. Jul. 2020. Communications of the ACM, vol. 63, No. 7. 12 pages.

Jouppi et al. Ten Lessons From Three Generations Shaped Google's TPUv4i. Sep. 6, 2021. 2021 ACM/IEEE 48th Annual International Symposium on Computer Architecture (ISCA). 14 pages.

Khaleghzadeh et al. A Hierarchical Data-Partitioning Algorithm for Performance Optimization of Data-Parallel Applications on Heterogeneous Multi-Accelerator NUMA Nodes. Dec. 16, 2019. IEEE Access, vol. 8, 2020. 16 pages.

Norrie et al. The Design Process for Google's Training Chips: TPUv2 and TPUv3. Feb. 28, 2021. 10 pages.

Patterson et al. Carbon Emissions and Large Neural Network Training. Apr. 21, 2021. 22 pages.

Smaragdos et al. BrainFrame: a node-level heterogeneous accelerator platform for neuron simulations. Nov. 10, 2017. Journal of Neural Engineering. 16 pages.

Office Action for Japanese Patent Application No. 2024-515413 dated Jun. 3, 2025. 5 pages.

* cited by examiner

HETEROGENEOUS ML ACCELERATOR CLUSTER WITH FLEXIBLE SYSTEM RESOURCE BALANCE

BACKGROUND

State of the art machine learning models can require hundreds to tens of thousands of the latest machine learning model accelerators to train, where these accelerators can be connected with high speed chip-to-chip interconnects to form a system that provides a required total computation and memory. For example, thousands of tensor processing unit (TPU) chips can be connected by inter-chip interconnects (ICIs) to form a TPU pod. Because each TPU accelerator has fixed computing and memory resources, a total system balance of aggregated computing and memory resources are also fixed. This creates a suboptimal situation because different machine learning models can require different resource balances on computing and memory. For a system with fixed resource ratios between computing and memory, some models may strand memory capacity while other models may strand computing resources.

BRIEF SUMMARY

Aspects of the disclosure are directed to a heterogeneous machine learning accelerator system with compute and memory nodes connected by high speed chip-to-chip interconnects. While existing remote/disaggregated memory may require memory expansion via remote processing units, aspects of the disclosure add memory nodes into machine learning accelerator clusters via the chip-to-chip interconnects without needing assistance from remote processing units to achieve higher performance, simpler software stack, and/or lower cost. The memory nodes may support prefetch and intelligent compression to enable the use of low cost memory without performance degradation.

An aspect of the disclosure provides for a machine learning accelerator system. The machine learning accelerator system includes: one or more accelerator clusters including a plurality of non-uniformly distributed memory nodes and a plurality of compute nodes connected by a high speed chip-to-chip interconnect; and one or more processors configured to prefetch machine learning models or data from slower memory nodes of the plurality of non-uniformly distributed memory nodes to on-chip memory in the compute nodes via the high speed interconnect.

In an example, the high speed interconnect includes an inter-chip interconnect (ICI) having a plurality of off-chip links and a plurality of on-chip links. In another example, the plurality of memory nodes are of varying types, including high bandwidth memory (HBM) and at least one of double data rate synchronous dynamic random access memory (DDR) or low power DDR (LPDDR). In yet another example, the plurality of compute nodes are of varying types, including at least two of tensor processing units (TPUs), graphics processing units (GPUs), or central processing units (CPUs).

In yet another example, the one or more processors are further configured to determine memory nodes of the plurality of memory nodes constitute the slower memory nodes based on a latency threshold. In yet another example, the one or more processors are further configured to prefetch the machine learning models or data from remote memory nodes of the plurality of memory nodes to the on-chip memory in the compute nodes via the high speed interconnect. In yet another example, the one or more processors are further configured to determine memory nodes of the plurality of memory nodes constitute the remote memory nodes based on locations of the memory nodes within the one or more accelerator clusters.

In yet another example, the one or more processors are further configured to swap the machine learning models or data between memory nodes of the plurality of memory nodes based on a hotness of the machine learning models or data. In yet another example, the one or more processors are further configured to determine a hotness of the machine learning models or data based on at least one of recency or frequency of use.

In yet another example, the one or more processors are further configured to keep a portion of the machine learning models or data uncompressed in faster memory nodes of the plurality of memory nodes. In yet another example, the one or more processors are further configured to: determine additional machine learning models or data are needed to perform a computation; and decompress the additional machine learning models or data from the slower memory nodes of the plurality of memory nodes. In yet another example, keeping a portion of the machine learning models or data uncompressed is based on at least one of recency or frequency of use.

Another aspect of the disclosure provides for a method for a machine learning accelerator system. The machine learning accelerator system includes one or more accelerator clusters including a plurality of non-uniformly distributed memory nodes and a plurality of compute nodes connected by a high speed chip-to-chip interconnect. The method includes: determining, by one or more processors, memory nodes of the plurality of memory nodes constitute slower memory nodes based on a latency threshold; and prefetching, by the one or more processors, machine learning models or data from the slower memory nodes to on-chip memory in the compute nodes via the high speed interconnect.

In an example, the method further includes: determining, by the one or more processors, memory nodes of the plurality of memory nodes constitute remote memory nodes based on locations of the memory nodes within the one or more accelerator clusters; and prefetching, by the one or more processors, the machine learning models or data from the remote memory nodes to the on-chip memory in the compute nodes via the high speed interconnect.

In another example, the method further includes: determining, by the one or more processors, a hotness of the machine learning models or data based on at least one of recency or frequency of use; and swapping, by the one or more processors, the machine learning models or data between memory nodes of the plurality of memory nodes based on the hotness of the machine learning models or data.

In yet another example, the method further includes: keeping, by the one or more processors, a portion of the machine learning models or data uncompressed in faster memory nodes of the plurality of memory nodes based on at least one of recency or frequency of use; determining, by the one or more processors, additional machine learning models or data are needed to perform a computation; and decompressing, by the one or more processors, the additional machine learning models or data from the slower memory nodes of the plurality of memory nodes.

Yet another aspect of the disclosure provides for a non-transitory computer readable medium for storing instructions that, when executed by one or more processors, cause the one or more processors to perform operations for a machine learning accelerator system. The machine learning accelerator system includes one or more accelerator clusters including a plurality of non-uniformly distributed memory nodes and a plurality of compute nodes connected by a high speed chip-to-chip interconnect. The operations include: determining memory nodes of the plurality of memory nodes constitute slower memory nodes based on a latency threshold; and prefetching machine learning models or data from the slower memory nodes to on-chip memory in the compute nodes via the high speed interconnect.

In an example, the operations further include: determining memory nodes of the plurality of memory nodes constitute remote memory nodes based on locations of the memory nodes within the one or more accelerator clusters; and prefetching the machine learning models or data from the remote memory nodes to the on-chip memory in the compute nodes via the high speed interconnect.

In another example, the operations further include: determining a hotness of the machine learning models or data based on at least one of recency or frequency of use; and swapping the machine learning models or data between memory nodes of the plurality of memory nodes based on the hotness of the machine learning models or data.

In yet another example, the operations further include: keeping a portion of the machine learning models or data uncompressed in faster memory nodes of the plurality of memory nodes based on at least one of recency or frequency of use; determining additional machine learning models or data are needed to perform a computation; and decompressing the additional machine learning models or data from the slower memory nodes of the plurality of memory nodes.

DETAILED DESCRIPTION

Generally disclosed herein are implementations for a heterogeneous machine learning accelerator system with compute and memory nodes connected by a high speed chip-to-chip interconnect. The memory nodes can support intelligent compression to enable the use of low cost memory without performance degradation. The high speed interconnected memory nodes are distinct from remote/disaggregated memory. In this regard, high speed interconnected memory nodes may be directly accessed by a processing unit host, whereas remote/disaggregated memory is accessed by the processing unit host through a remote processing unit system stack. Accessing the remote/disaggregated memory through the remote processing unit system stack may introduce delays, thereby lowering the performance of the remote/disaggregated memory relative to the interconnected memory nodes. Further, expensive processing unit resources can be stranded from the accelerator system in assisting accessing such remote/disaggregated memory.

The accelerator system can include one or more accelerator clusters, each having a plurality of memory nodes and a plurality of compute nodes connected by the same high speed chip-to-chip interconnect, such as an inter-chip interconnect (ICI). The high speed interconnect can include a plurality of off-chip links and a plurality of on-chip links connected with an on-chip router. The off-chip links and on-chip links can have high data throughputs, to allow for large amounts of data to be quickly transmitted both on and off chip. The high speed interconnect can include an optical interconnect or a high speed ethernet.

The memory nodes can include the same or different memory types in the accelerator cluster, including high bandwidth memory (HBM), double data rate synchronous dynamic random access memory (DDR), low power DDR (LPDDR), dynamic random access memory (DRAM), flash memory, or non-volatile RAM. The compute nodes can also include the same or different compute types, including tensor processing units (TPUs), graphics processing units (GPUs), and central processing units (CPUs).

The compute nodes can include different hardware having different computing capabilities. For example, some compute nodes can have different assistive hardware, such as some compute nodes being designed or optimized for one function, such as video/image processing, while other compute nodes within the same cluster can be designed or optimized for another function, such as natural language processing. The compute nodes can also be managed by software or managed by hardware as well as have varying power efficiency and persistence of memory depending on the memory types included in the memory nodes. For example, the compute nodes can have varying power efficiency for LPDDR, DDR, and HBM and varying persistence of memory for DRAM, flash memory, or non-volatile RAM.

A resource balance on computing and memory on the accelerator cluster can be changed by installing or pre-installing and activating additional memory nodes and/or compute nodes. The additional memory nodes and/or compute nodes can be distributed across the accelerator cluster uniformly or non-uniformly. Uniformly distributed memory nodes can correspond to additional memory nodes being the same, such as having the same capacity and/or latency while non-uniformly distributed memory nodes can correspond to additional memory nodes varying, such as having varying capacity and/or latency.

Uniformly or non-uniformly distributed memory nodes can be placed together in adjacent memory racks and connected to the accelerator cluster via the high speed interconnect. The memory racks can correspond to remote/disaggregated memory, which can be physically or logically partitioned to serve as memory pools for different accelerator clusters.

The plurality of memory nodes can introduce a memory hierarchy based on non-uniformly distributed memory nodes having different memory latencies. To factor in the memory hierarchy, software for the accelerator cluster can utilize active prefetch and/or memory swap. The compute nodes can include high performance on-chip memory, e.g., CMEM.

The software for the accelerator cluster can prefetch machine learning models and/or data from remote and/or slower memory nodes to the on-chip memory in the compute nodes. The software can determine which memory nodes can constitute slower memory nodes based on configurable latency thresholds, which can be based on configurable performance and/or efficiency requirements. For example, if the access latency of a memory node is longer than a high bandwidth memory access latency, the memory node can be considered slower. The software can also determine which memory nodes can constitute remote memory nodes based on whether they are part of the accelerator cluster. The machine learning models can include tensors and/or layers and the data can include training data and/or verification data. For example, DDR and/or LPDDR memory nodes can have their machine learning models and/or data prefetched while HBM memory nodes do not need to have their machine learning models and/or data prefetched. Prefetching allows for a working set of machine learning models and data to be ready for access from the on-chip memory when computation occurs.

The software for the accelerator cluster can also swap machine learning models and/or data between memory nodes based on the hotness of the machine learning models and/or data. For example, machine learning models and/or data that has been recently used or is likely to be more frequently used can be placed at nearer or faster memory nodes, such as the HBM, while machine learning models and/or data that has not been recently or is likely to be rarely used can be placed at more remote/farther or slower memory nodes, such as DDR. Thresholds for recent use and frequency of use can be configurable depending on performance and/or efficiency requirements.

By using low cost and dense memory, such as DDR and LPDDR, the total memory capacity of a machine learning accelerator cluster can be expanded, and the resource balance of computing and memory can be dynamic as well. Further, because the software can prefetch the machine learning models and/or data from remote and/or slower memory nodes, memory capacity can be further expanded by adding intelligent memory compression to the remote memory nodes. The memory nodes can include hardware compression engines, which can perform intelligent memory compression and prefetch instead of compressing/decompressing at the moment of fetching.

The software can keep a portion of the machine learning models and/or data uncompressed in a faster memory node, e.g., HBM, and decompress additional models and/or data when needed. The software can execute a cache replacement policy, such as a least recently used (LRU) or most frequently used (MFU) algorithm, to keep a portion of the machine learning models and/or data uncompressed in the faster memory node. The software can also execute more sophisticated cache replacement policies, such as algorithms that combine LRU and MFU, to determine which portions of the machine learning models and/or data to keep uncompressed. For example, the software can prefetch or decompress based on input data for the machine learning models and fetch or decompress additional models/data as that input data is processed.

Figure 1:
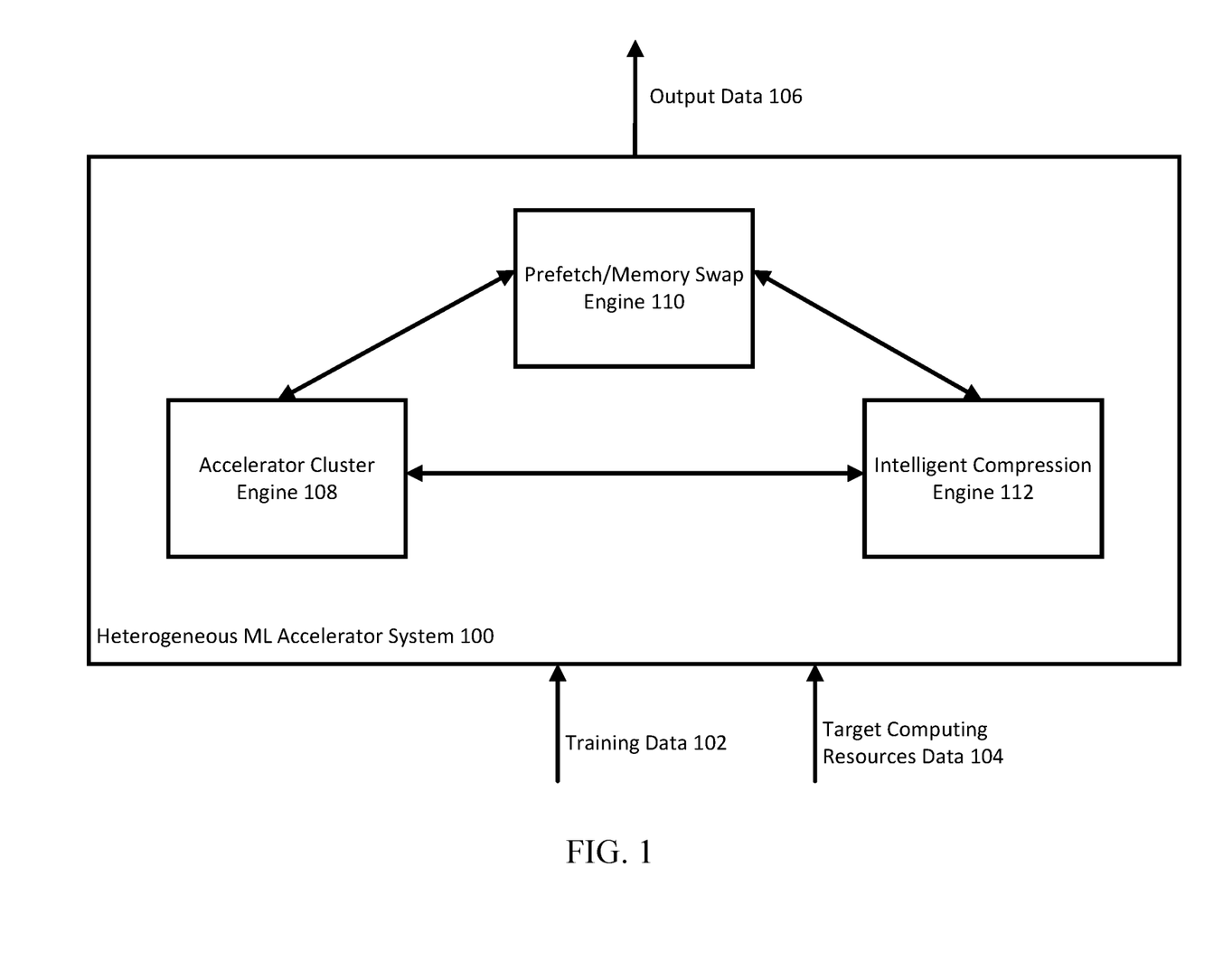
FIG. 1 depicts a block diagram of an example heterogeneous machine learning accelerator system according to aspects of the disclosure.

FIG. 1 depicts a block diagram of an example heterogeneous machine learning accelerator system 100. The heterogeneous accelerator system 100 can be configured to receive input data, such as via a user interface. For example, the heterogeneous accelerator system 100 can receive the input data as part of a call to an API exposing the heterogeneous accelerator system 100. The heterogeneous accelerator system 100 can be implemented on one or more computing devices. Input to the heterogeneous accelerator system 100 can be provided, for example, through a storage medium, including remote storage connected to the one or more computing devices over a network, or as input through a user interface on a client computing device coupled to the heterogeneous accelerator system 100.

The heterogeneous accelerator system 100 can be configured to receive training data 102 for training a machine learning model and target computing resources data 104 specifying target computing resources. The training data 102 can correspond to a machine learning task, such as a neural network task performed by a neural network. The training data 102 can be split into a training set, a validation set, and/or a testing set. An example training/testing split can be an 80/20 split. The machine learning model can be configured to receive any type of input data to generate output data 106 for performing the machine learning task. As examples, the output data 106 can be any kind of score, classification, or regression output based on the input data. Correspondingly, the machine learning task can be a scoring, classification, and/or regression task for predicting some output given some input. These machine learning tasks can correspond to a variety of different applications in processing images, video, text, speech, or other types of data.

The training data 102 can be in any form suitable for training a machine learning model, according to one of a variety of different learning techniques. Learning techniques for training a machine learning model can include supervised learning, unsupervised learning, and semi-supervised learning techniques. For example, the training data 102 can include multiple training examples that can be received as input by a machine learning model. The training examples can be labeled with a desired output for the machine learning model when processing the labeled training examples. The label and the model output can be evaluated through a loss function to determine an error, which can be backpropagated through the machine learning model to update weights for the machine learning model. For example, if the machine learning task is a classification task, the training examples can be images labeled with one or more classes categorizing subjects depicted in the images. As another example, a supervised learning technique can be applied to calculate an error between outputs, with a ground-truth label of a training example processed by the machine learning model. Any of a variety of loss or error functions appropriate for the type of the task the machine learning model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated. The machine learning model can be trained until stopping criteria are met, such as a number of iterations for training, a maximum period of time, a convergence, or when a minimum accuracy threshold is met.

The target computing resources data 104 can specify characteristics for computing resources on which a neural network can be at least partially deployed. Computing resources can be housed in one or more datacenters or other physical locations hosting any of a variety of different types of hardware devices. Example types of hardware include central processing units (CPUs), graphics processing units (GPUs), edge or mobile computing devices, field programmable gate arrays (FPGAs) and various types of application-specific circuits (ASICs).

Some devices can be configured for hardware acceleration, which can include devices configured for efficiently performing certain types of operations. These hardware accelerators, which can for example include GPUs and tensor processing units (TPUs), can implement special features for hardware acceleration. Example features for hardware acceleration can include configuration to perform operations commonly associated with machine learning model execution, such as matrix multiplication. These special features can also include, as examples, matrix-multiply-and-accumulate units available in different types of GPUs, as well as matrix multiply units available in TPUs.

The target computing resources data 104 can include data for one or more target sets of computing resources. A target set of computing resources can refer to a collection of computing devices on which a machine learning model is desired to be deployed over. Information specifying the target set of computing resources can refer to the type and/or quantity of hardware accelerators or other computing devices in the target set. The target set can include devices of the same or different types. For example, a target set of computing resources can define hardware characteristics and quantity for a particular type of hardware accelerator, including its processing capability, throughput, and memory capacity. As described herein, the heterogeneous accelerator system 100 can generate one or more machine learning model architectures for each device specified in the target set of computing resources. In some examples, the target set of computing resources can specify computing resources for devices with less overall computational capacity than devices in a datacenter, such as mobile phones or wearable devices, e.g., headphones, earbuds, or smartwatches, on which a machine learning model is deployed. In addition, the target computing resources data 104 can specify different target sets of computing resources, reflecting for example different potential configurations of computing resources housed in a data center.

From the training data 102 and target computing resources data 104, the heterogeneous accelerator system 100 can be configured to output one or more results of a machine learning tasks generated as output data 106. The output data 106 can be sent for display on a user display, as an example. In some implementations, the heterogeneous accelerator system 100 can be configured to provide the output data 106 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model.

The heterogeneous accelerator system 100 can be configured to forward the output data 106 to one or more other devices configured for translating the output data 106 into an executable program written in a computer programming language and optionally as part of a framework for generating machine learning models. The heterogeneous accelerator system 100 can also be configured to send the output data 106 to a storage device for storage and later retrieval.

The heterogeneous accelerator system 100 can include an accelerator cluster engine 108. The accelerator cluster engine 108 can be implemented as one or more computer programs, specially configured electronic circuitry, or any combination of the preceding. The accelerator cluster engine 108 can be configured to generate one or more accelerator clusters, each having a plurality of memory nodes and a plurality of compute nodes connected by a high speed chip-to-chip interconnect. The memory nodes can include the same or different types of memory and the compute nodes can include the same or different types of processing units. The accelerator cluster engine 108 can generate the accelerator clusters based on the target computing resources data 104. Generating the accelerator clusters can include determining whether to activate additional memory nodes and/or compute nodes as well as whether to distribute the additional memory nodes and/or compute nodes across the accelerator cluster uniformly or non-uniformly based on the target computing resources data 104.

The heterogeneous accelerator system 100 can further include a prefetch/memory swap engine 110. The prefetch/memory swap engine 110 can be implemented as one or more computer programs, specially configured electronic circuitry, or any combination of the preceding. The prefetch/memory swap engine 110 can be configured to prefetch machine learning models and/or input data, such as the training data 102, from remote and/or slower memory nodes to on-chip memory in the compute nodes to allow for a working set of machine learning models and/or input data to be ready for access when computation occurs. The prefetch/memory swap engine 110 can determine which memory nodes constitute slower memory nodes based on configurable latency thresholds, which can be defined by performance and/or efficiency requirements of the target computing resources data 104. The prefetch/memory swap engine 110 can determine which memory nodes constitute remote memory nodes based on their location within or outside of an accelerator cluster.

The prefetch/memory swap engine 110 can also be configured to swap machine learning models and/or input data between memory nodes based on a hotness of the machine learning models and/or input data. The prefetch/memory swap engine 110 can determine hotness based on configurable thresholds for recent use and/or frequency of use, which can be defined by performance and/or efficiency requirements of the target computing resources data 104.

The heterogeneous accelerator system 100 can further include an intelligent compression engine 112. The intelligent compression engine 112 can be implemented as one or more computer programs, specially configured electronic circuitry, or any combination of the preceding. The intelligent compression engine 112 can be configured to maintain a portion of the machine learning models and/or input data uncompressed in faster memory nodes and decompress additional machine learning models and/or input data when needed. The intelligent compression engine 112 can execute a cache replacement policy, such as a least recently used (LRU) algorithm, most frequently used (MFU) algorithm, or combination algorithm thereof, to determine which portions of the machine learning models and/or input data to keep uncompressed.

Figure 2:
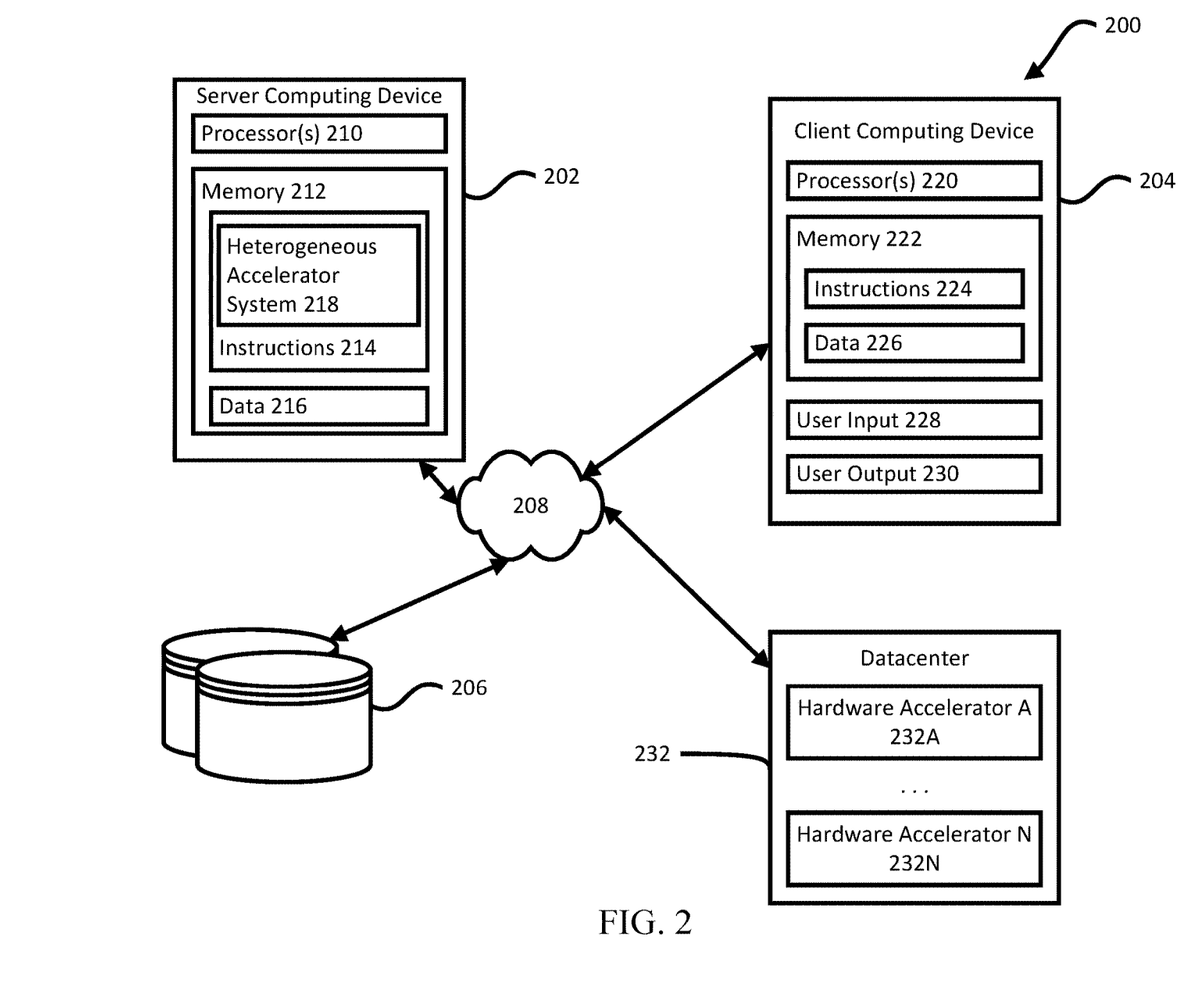
FIG. 2 depicts a block diagram of an example environment for implementing a heterogeneous accelerator system according to aspects of the disclosure.

FIG. 2 depicts a block diagram of an example environment 200 for implementing a heterogeneous accelerator system. The system 200 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing a heterogeneous accelerator system 218, which can correspond to the heterogeneous accelerator system 100 of FIG. 1. The heterogeneous accelerator system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a datacenter 232 housing any number of hardware accelerators 232A-N. The datacenter 232 can be one of multiple datacenters or other facilities in which various types of computing devices, such as hardware accelerators, are located. Computing resources housed in the datacenter 232 can be specified for deploying neural network architectures on hardware architectures, as described herein.

The server computing device 202 can be configured to receive requests to process data from the client computing device 204 on computing resources in the datacenter 232. For example, the environment 200 can be part of a computing platform configured to provide a variety of services to users, through various user interfaces and/or application programming interfaces (APIs) exposing the platform services. One or more services can be a machine learning framework or a set of tools for generating neural networks or other machine learning models according to a specified task and training data. The client computing device 204 can receive and transmit data specifying target computing resources to be allocated for executing a machine learning model trained to perform a particular machine learning task. The heterogeneous accelerator system 218 can receive the data specifying the target computing resources and/or training data, and in response, generate output data for deploying on the target computing resources.

As other examples of potential services provided by a platform implementing the environment 200, the server computing device 202 can maintain a variety of machine learning models in accordance with different potential target computing resources available at the datacenter 232. For example, the server computing device 202 can maintain different families for deploying neural networks on the various types of TPUs and/or GPUs housed in the datacenter 232 or otherwise available for processing.

The devices 202, 204 and the datacenter 232 can be capable of direct and indirect communication over the network 208. For example, using a network socket, the client computing device 204 can connect to a service operating in the datacenter 232 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 208, in addition or alternatively, can also support wired connections between the devices 202, 204 and the datacenter 232, including over various types of Ethernet connection.

Although a single server computing device 202, client computing device 204, and datacenter 232 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, and any combination thereof.

Figure 3:
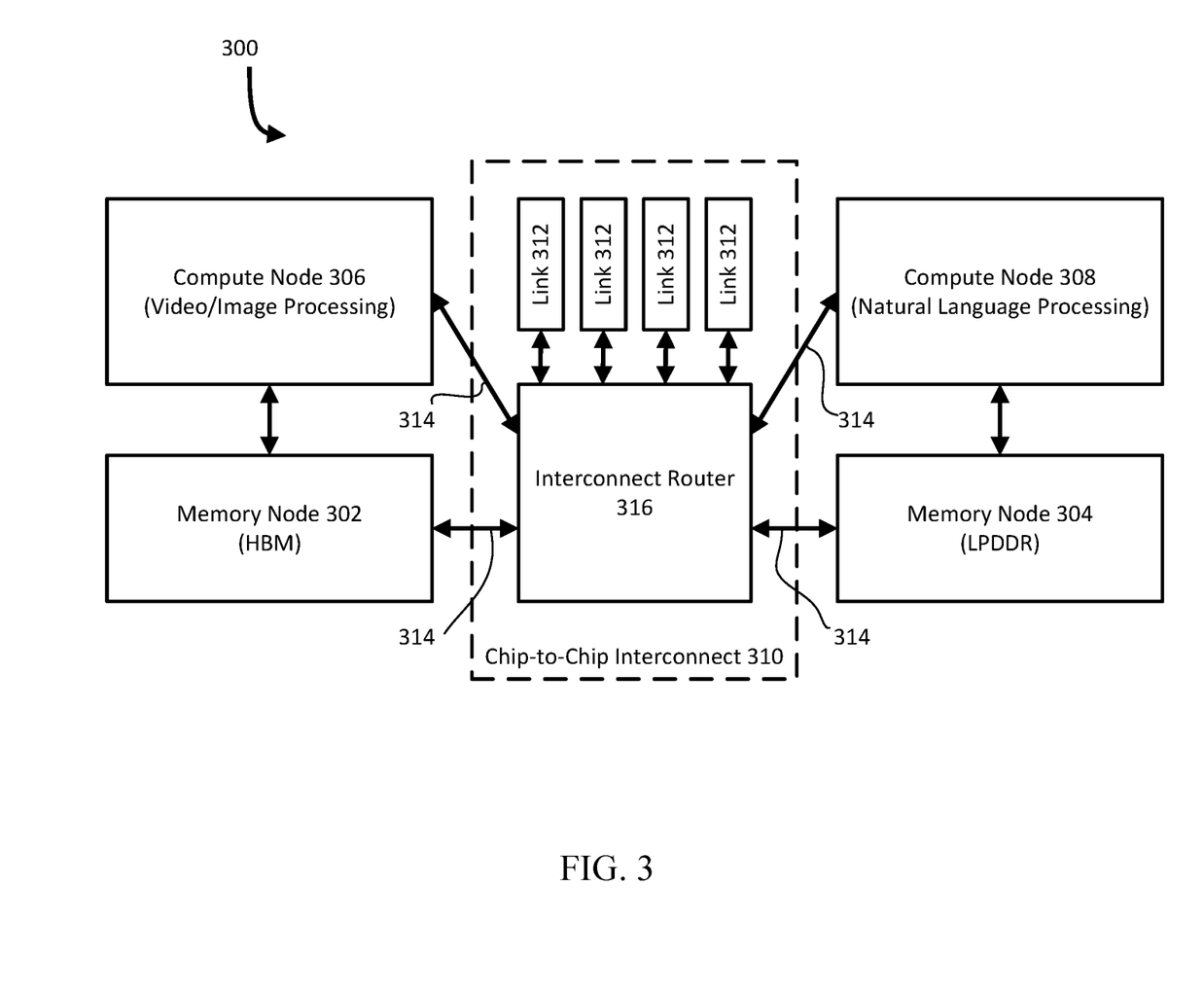
FIG. 3 depicts a block diagram of an example accelerator cluster according to aspects of the disclosure.

FIG. 3 depicts a block diagram of an example accelerator cluster 300. The accelerator cluster 300 includes a plurality of memory nodes and a plurality of compute nodes. While two memory nodes and two compute nodes are shown in FIG. 3, the accelerator cluster 300 can include any number of memory nodes and compute nodes. As depicted, the plurality of memory nodes includes a first memory node 302 and a second memory node 304 and the plurality of compute nodes includes a first compute node 306 and a second compute node 308.

The memory nodes can include the same or different memory types in the accelerator cluster 300, including high bandwidth memory (HBM), double data rate synchronous dynamic random access memory (DDR), low power DDR (LPDDR), dynamic random access memory (DRAM), flash memory, or non-volatile RAM. For example, the memory node 302 can correspond to HBM while the memory node 304 can correspond to LPDDR.

The compute nodes can include the same or different compute types, including tensor processing units (TPUs), graphics processing units (GPUs), and central processing units (CPUs). The compute nodes can also include different hardware having different computing capabilities or different assistive hardware. For example, the compute node 306 can be designed or optimized for one function, such as video/image processing, while the compute node 308 can be designed or optimized for another function, such as natural language processing. The compute nodes can also be managed by software or managed by hardware as well as have varying power efficiency and persistence of memory depending on the memory types included in the memory nodes. For example, the compute nodes can have varying power efficiency for LPDDR, DDR, and HBM and varying persistence of memory for DRAM, flash memory, or non-volatile RAM.

The memory nodes and compute nodes are connected by a high speed chip-to-chip interconnect 310, such as an inter-chip interconnect (ICI). The high speed interconnect 310 can include a plurality of off-chip links 312 and a plurality of on-chip links 314 connected via an interconnect router 316. The off-chip links 312 can connect to an interconnect router on a separate chip (not shown) to connect compute nodes and/or memory nodes to other compute nodes and/or memory nodes on separate chips. The on-chip links 314 can connect compute nodes and/or memory nodes on the same chip though the interconnect router 316. While four off-chip links 312 and two on-chip links 314 are shown in FIG. 3, the accelerator cluster 300 can include any number of off-chip links 312 and on-chip links 314. The off-chip links 312 and on-chip links 314 can have high data throughputs to allow for large amounts of data to be quickly transmitted both on and off chip. For example, the off-chip links 312 may be capable of 500 Gbits/second, or more or less, and the on-chip links may be capable of 1000 Gbits/second, or more or less. The high speed interconnect 310 can include an optical interconnect or a high speed ethernet.

The high speed interconnected memory nodes and computer notes are distinct from remote/disaggregated memory. In this regard, high speed interconnected memory nodes can be directly accessed by a compute node, whereas remote/disaggregated memory must be accessed by a processing unit host through a remote processing unit system stack. Accessing the remote/disaggregated memory through the remote processing unit system stack can introduce delays, thereby lowering the performance of the remote/disaggregated memory relative to the interconnected memory nodes. Further, expensive processing unit resources can be stranded from the accelerator cluster in assisting accessing such remote/disaggregated memory.

Figure 4:
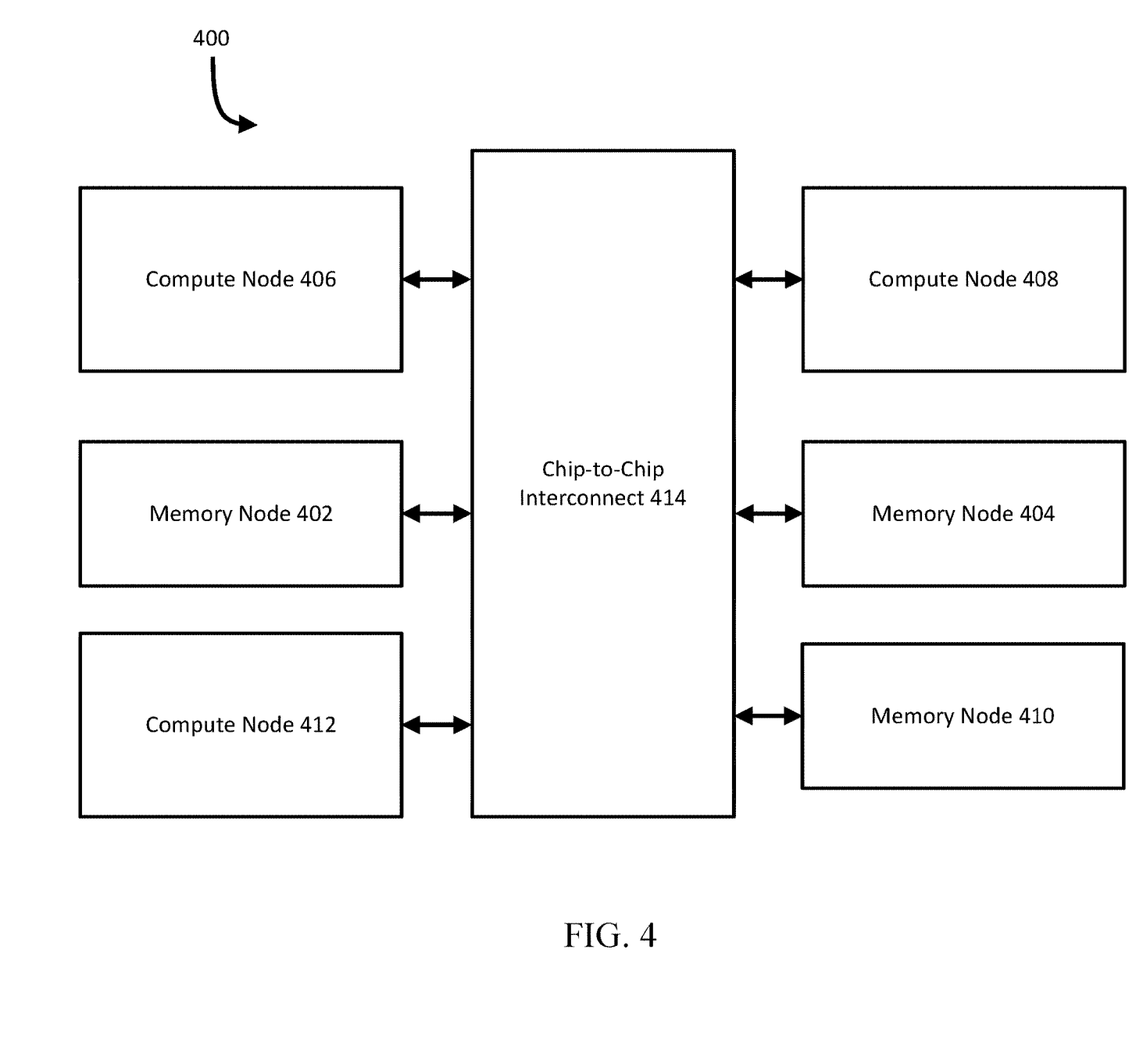
FIG. 4 depicts a block diagram of an example accelerator cluster with an additional compute node and additional memory node according to aspects of the disclosure.

Based on target computing resources data, additional memory nodes and/or compute nodes can be installed or pre-installed and activated to change a resource balance on computing and memory on the accelerator cluster. FIG. 4 depicts a block diagram of an example accelerator cluster 400 with an additional compute node and additional memory node. Similar to the accelerator cluster depicted in FIG. 3, the accelerator cluster 400 includes a plurality of memory nodes and a plurality of compute nodes. The plurality of memory nodes includes a first memory node 402 and a second memory node 404 and the plurality of compute nodes includes a first compute node 406 and a second compute node 408. Based on target computing resources, for the accelerator cluster 400, the plurality of memory nodes includes an additional memory node 410 and an additional compute node 412. The memory nodes and compute nodes are connected by a high speed chip-to-chip interconnect 414, such as an inter-chip interconnect (ICI). While an additional memory node 410 and an additional compute node 412 are depicted in FIG. 4, the accelerator cluster 400 can include any number of additional memory nodes or compute nodes.

The additional memory nodes and/or compute nodes can be distributed across the accelerator cluster 400 uniformly or non-uniformly. Uniformly distributed memory nodes can correspond to additional memory nodes being the same, such as having the same capacity and/or latency, while non-uniformly distributed memory nodes can correspond to additional memory nodes varying, such as having varying capacity and/or latency. For example, non-uniformly distributed memory nodes can include one memory node corresponding to HBM and another memory node corresponding to LPDDR. Similarly, uniformly distributed compute nodes can correspond to additional compute nodes being the same, such as having the same processing capability, while non-uniformly distributed compute nodes can correspond to additional compute node varying, such as having varying processing capabilities. For example, non-uniformly distributed compute nodes can include one compute node corresponding to a TPU and another compute node corresponding to a CPU.

The plurality of memory nodes can introduce a memory hierarchy based on non-uniformly distributed memory nodes having different memory latencies. To factor in the memory hierarchy, software for the accelerator cluster can utilize active prefetch and/or memory swap.

Figure 5:
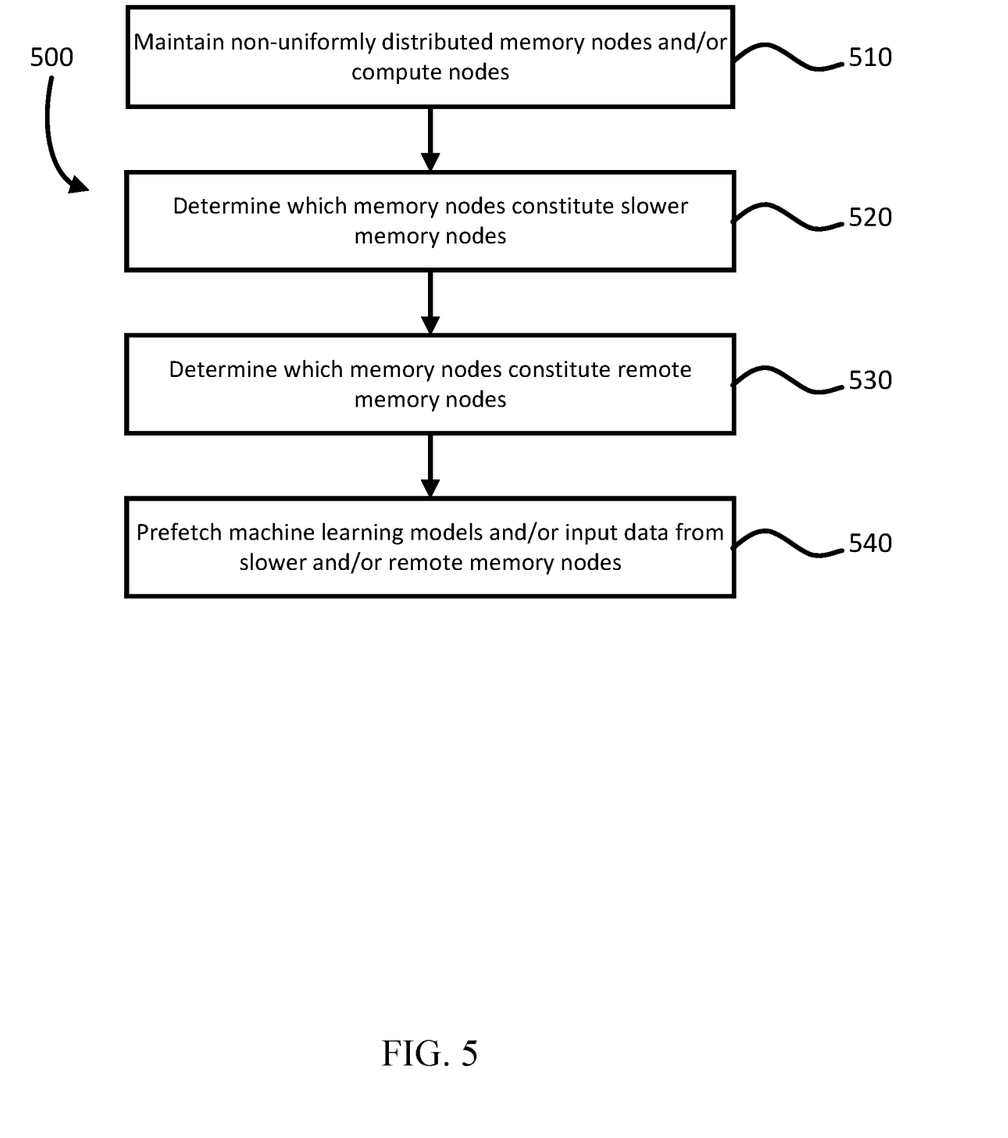
FIG. 5 depicts a flow diagram of an example process for active prefetch according to aspects of the disclosure.

FIG. 5 depicts a flow diagram of an example process 500 for actively prefetching machine learning models and/or input data from remote and/or slower memory nodes to on-chip memory in the computer nodes. The example process 500 can be performed on a system of one or more processors in one or more locations, such as the heterogeneous accelerator system 100 of FIG. 1.

As shown in block 510, the accelerator cluster engine 108 can maintain non-uniformly distributed memory nodes and/or non-uniformly distributed compute nodes as one or more accelerator clusters.

As shown in block 520, the prefetch/memory swap engine 110 can determine which memory nodes constitute slower memory nodes based on configurable latency thresholds. The latency thresholds can depend on configurable performance and/or efficiency requirements, such as from the target computing resources data 104. For example, if access latency of a memory node is longer than a predetermined high bandwidth memory access latency, the prefetch/memory swap engine 110 can determine that that memory node is slower. The prefetch/memory swap engine 110 can also determine which memory nodes constitute slower memory nodes based on the type of memory node. For example, DDR and/or LPDDR memory nodes can constitute slower memory nodes while HBM can constitute a faster memory node.

As shown in block 530, the prefetch/memory swap engine 110 can determine which memory nodes constitute remote memory nodes based on their location within or outside of one or more accelerator clusters. For example, memory nodes within an accelerator cluster that contains one or more compute nodes being utilized for computation would not constitute remote memory nodes while memory nodes outside of that accelerator cluster would constitute remote memory nodes.

As shown in block 540, the prefetch/memory swap engine 110 can prefetch machine learning models and/or input data from the slower and/or remote memory nodes. Faster and/or closer memory nodes would not need to have their machine learning models and/or input data prefetched. Prefetching allows for a working set of machine learning models and/or input data to be ready for access from the on-chip memory in the compute nodes for when computation occurs.

Figure 6:
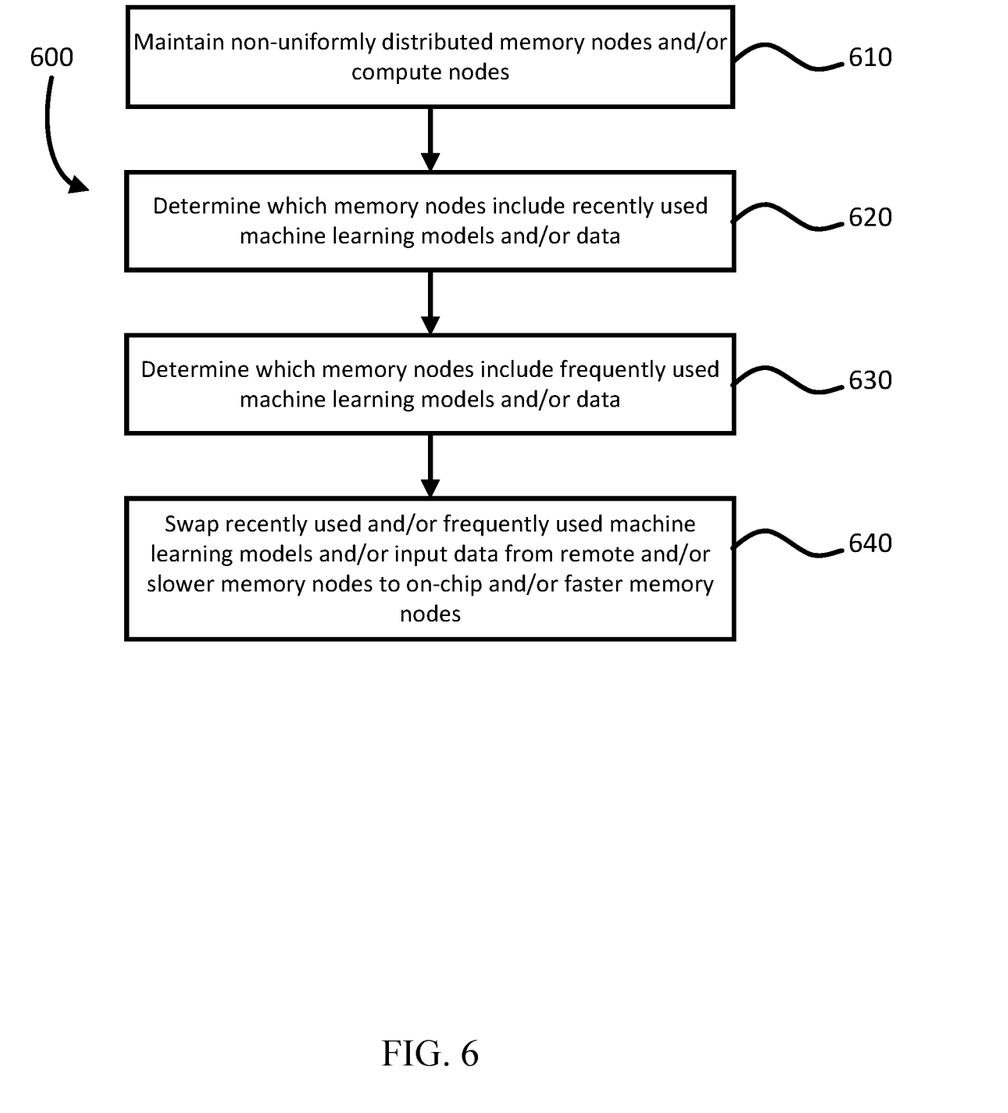
FIG. 6 depicts a flow diagram of an example process for memory swapping according to aspects of the disclosure.

FIG. 6 depicts a flow diagram of an example process 600 for swapping machine learning models and/or input data between memory nodes based on a hotness of the machine learning models and/or input data. The example process 600 can be performed on a system of one or more processors in one or more locations, such as the heterogeneous accelerator system 100 of FIG. 1.

As shown in block 610, the accelerator cluster engine 108 can maintain non-uniformly distributed memory nodes and/or non-uniformly distributed compute nodes as one or more accelerator clusters.

As shown in block 620, the prefetch/memory swap engine 110 can determine which memory nodes include recently used machine learning models and/or input data based on recency thresholds. The recency thresholds can depend on configurable performance and/or efficiency requirements, such as from the target computing resources data 104.

As shown in block 630, the prefetch/memory swap engine 110 can determine which memory nodes include frequency used machine learning models and/or input data based on frequency thresholds. The frequency thresholds can depend on configurable performance and/or efficiency requirements, such as from the target computing resources data 104.

As shown block 640, the prefetch/memory swap engine 110 can swap recently and/or frequency used machine learning models and/or input data from slower and/or remote memory nodes to faster and/or closer memory nodes. The prefetch/memory swap engine 110 can also swap machine learning models and/or input data that has not been recently used and/or rarely used from faster and/or closer memory nodes to slower and/or remote memory nodes. For example, more recently and/or frequently used machine learning models and/or data can be placed in HBM while less recently and/or frequently used machine learning models and/or data can be placed in DDR.

The total memory capacity of the machine learning accelerator clusters can be expanded by using low cost and dense memory and prefetching or swapping from that memory when needed. Memory capacity can be further expanded by adding intelligent memory compression to the remote memory nodes. Software can perform the intelligent memory compression and prefetch instead of compressing/decompression at the moment of fetching.

Figure 7:
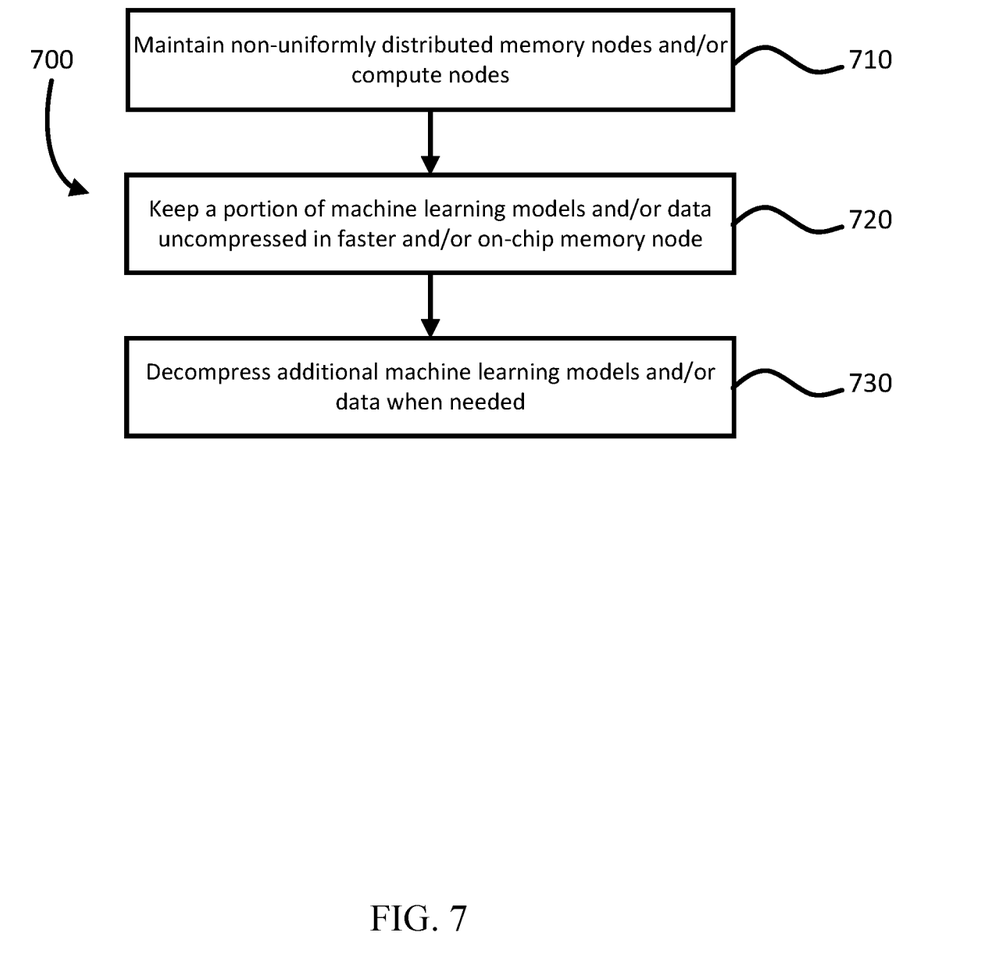
FIG. 7 depicts a flow diagram of an example process for intelligent memory compression according to aspects of the disclosure.

FIG. 7 depicts a flow diagram of an example process 700 for intelligent memory compression. The example process 700 can be performed on a system of one or more processors in one or more locations, such as the heterogeneous accelerator system 100 of FIG. 1.

As shown in block 710, the accelerator cluster engine 108 can maintain non-uniformly distributed memory nodes and/or non-uniformly distributed compute nodes as one or more accelerator clusters.

As shown in block 720, the intelligent compression engine 112 can keep a portion of the machine learning models and/or input data uncompressed in faster and/or closer memory nodes. For example, the intelligent compression engine 112 can keep a portion of the machine learning models and/or input data uncompressed in HBM. The intelligent compression engine 112 can execute a cache replacement policy, such as a least recently used (LRU) or most frequency used (MFU) algorithm, to keep a portion of the machine learning models and/or input data uncompressed in the faster and/or closer memory nodes, such as HBM. The intelligent compression engine 112 can also execute more sophisticated cache replacements policies, such as algorithms that are a combination of LRU and MFU, to determine which portions of the machine learning models and/or input data to keep uncompressed.

As shown in block 730, the intelligent compression engine 112 can decompress additional machine learning models and/or input data when needed for further computation. For example, for a mixture of experts (MoE) model, if K experts of an MoE model are stored in HBM, with compression, n*K experts can be stored in the HBM, where n is the compression ratio. Then, during training or inference, the intelligent compression engine 112 can keep a portion of the total experts of the MoE model uncompressed to reside in the HBM for normal training or inference. When model training or inference would like to access an expert and finds that that expert is not in the HBM, then the model training or inference misses that expert and the intelligent compression engine 112 can fetch from remote memory and/or decompress a new expert. A memory access penalty based on waiting for memory content to be available can be included for not only fetching experts from remote memory but also for decompressing experts. The software can execute a LRU or MFU algorithm to keep a subset of experts in the HBM uncompressed. The software can also execute a more sophisticated algorithm, such as a combination of LRU and/or MFU, based on input data when the MoE model has individual experts to process different input data.

As described herein, aspects of the disclosure provide for a heterogeneous machine learning accelerator system. Examples of machine learning model or neural network tasks follow.

As an example, an input to the machine learning model can be in the form of images, videos. The machine learning model can be configured to extract, identify, and generate features as part of processing a given input, for example as part of a computer vision task. A machine learning model trained to perform this type of neural network task can be trained to generate an output classification from a set of different potential classifications. In addition to or alternatively, the machine learning model can be trained to output a score corresponding to an estimated probability that an identified subject in the image or video belongs to a certain class.

As another example, the input to the machine learning model can be data files corresponding to a particular format, e.g., HTML files, word processing documents, or formatted metadata obtained from other types of data, such as metadata for image files. A machine learning task in this context can be to classify, score, or otherwise predict some characteristic about the received input. For example, a machine learning model can be trained to predict the probability received input includes text relating to a particular subject. Also, as part of performing a particular task, the machine learning model can be trained to generate text predictions, for example as part of a tool for auto-completion of text in a document as the document is being composed. A machine learning model can also be trained for predicting a translation of text in an input document to a target language, for example as a message is being composed.

Other types of input documents can be data relating to characteristics of a network of interconnected devices. These input documents can include activity logs, as well as records concerning access privileges for different computing devices to access different sources of potentially sensitive data. A machine learning model can be trained for processing these and other types of documents for predicting on-going and future security breaches to the network. For example, the machine learning model can be trained to predict intrusion into the network by a malicious actor.

As another example, the input to a machine learning model can be audio input, including streamed audio, pre-recorded audio, and audio as part of a video or other source or media. A machine learning task in the audio context can include speech recognition, including isolating speech from other identified sources of audio and/or enhancing characteristics of identified speech to be easier to hear. A machine learning model can be trained to predict an accurate translation of input speech to a target language, for example in real-time as part of a translation tool.

In addition to data input, including the various types of data described herein, a machine learning model can also be trained to process features corresponding to given input. Features are values, e.g., numerical or categorical, which relate to some characteristic of the input. For example, in the context of an image, a feature of the image can relate to the RGB value for each pixel in the image. A machine learning task in the image/video context can be to classify contents of an image or video, for example for the presence of different people, places, or things. Machine learning models can be trained to extract and select relevant features for processing to generate an output for a given input and can also be trained to generate new features based on learned relationships between various characteristics of input data.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A machine learning accelerator system, comprising:
   one or more accelerator clusters comprising a plurality of non-uniformly distributed memory nodes and a plurality of compute nodes connected by a high speed chip-to-chip interconnect that facilitates transfer of machine learning models or data, the non-uniformly distributed memory nodes having varying capacities or latencies; and
   one or more processors configured to:
      keep a portion of the machine learning models or data uncompressed in faster memory nodes of the plurality of memory nodes and a portion of the machine learning models or data compressed in slower memory nodes of the plurality of memory nodes; and
      based on a latency threshold for the non-uniformly distributed memory nodes, prefetch the machine learning models or data from the slower memory nodes of the plurality of non-uniformly distributed memory nodes to on-chip memory in the compute nodes via the high speed interconnect.

2. The system of claim 1, wherein the high speed interconnect comprises an inter-chip interconnect (ICI) having a plurality of off-chip links and a plurality of on-chip links.

3. The system of claim 1, wherein the plurality of memory nodes are of varying types, comprising high bandwidth memory (HBM) and at least one of double data rate synchronous dynamic random access memory (DDR) or low power DDR (LPDDR).

4. The system of claim 1, wherein the plurality of compute nodes are of varying types, comprising at least two of tensor processing units (TPUs), graphics processing units (GPUs), or central processing units (CPUs).

5. The system of claim 1, wherein the one or more processors are further configured to determine memory nodes of the plurality of memory nodes constitute the slower memory nodes from the latency threshold.

6. The system of claim 1, wherein the one or more processors are further configured to prefetch the machine learning models or data from remote memory nodes of the plurality of memory nodes to the on-chip memory in the compute nodes via the high speed interconnect.

7. The system of claim 6, wherein the one or more processors are further configured to determine memory nodes of the plurality of memory nodes constitute the remote memory nodes based on locations of the memory nodes within the one or more accelerator clusters.

8. The system of claim 1, wherein the one or more processors are further configured to swap the machine learning models or data between memory nodes of the plurality of memory nodes based on a hotness of the machine learning models or data.

9. The system of claim 8, wherein the one or more processors are further configured to determine a hotness of the machine learning models or data based on at least one of recency or frequency of use.

10. The system of claim 1, wherein the one or more processors are further configured to compress the portion of the machine learning models or data in the slower memory nodes of the plurality of memory nodes.

11. The system of claim 10, wherein the one or more processors are further configured to:
determine additional machine learning models or data are needed to perform a computation; and
decompress the additional machine learning models or data from the slower memory nodes of the plurality of memory nodes.

12. The system of claim 1, wherein keeping a portion of the machine learning models or data uncompressed is based on at least one of recency or frequency of use.

13. A method for a machine learning accelerator system, the machine learning accelerator system including one or more accelerator clusters including a plurality of non-uniformly distributed memory nodes and a plurality of compute nodes connected by a high speed chip-to-chip interconnect that facilitates transfer of machine learning models or data, the non-uniformly distributed memory nodes having varying capacities or latencies, the method comprising:
determining, by one or more processors, memory nodes of the plurality of memory nodes constitute slower memory nodes based on a latency threshold for the non-uniformly distributed memory nodes;
keeping, by the one or more processors, a portion of the machine learning models or data uncompressed in faster memory nodes of the plurality of memory nodes and a portion of the machine learning models or data compressed in the slower memory nodes of the plurality of memory nodes; and
prefetching, by the one or more processors, the machine learning models or data from the slower memory nodes to on-chip memory in the compute nodes via the high speed interconnect.

14. The method of claim 13, further comprising:
determining, by the one or more processors, memory nodes of the plurality of memory nodes constitute remote memory nodes based on locations of the memory nodes within the one or more accelerator clusters; and
prefetching, by the one or more processors, the machine learning models or data from the remote memory nodes to the on-chip memory in the compute nodes via the high speed interconnect.

15. The method of claim 13, further comprising:
determining, by the one or more processors, a hotness of the machine learning models or data based on at least one of recency or frequency of use; and
swapping, by the one or more processors, the machine learning models or data between memory nodes of the plurality of memory nodes based on the hotness of the machine learning models or data.

16. The method of claim 13, further comprising:
determining, by the one or more processors, additional machine learning models or data are needed to perform a computation; and
decompressing, by the one or more processors, the additional machine learning models or data from the slower memory nodes of the plurality of memory nodes.

17. A non-transitory computer readable medium for storing instructions that, when executed by one or more processors, cause the one or more processors to perform operations for a machine learning accelerator system, the machine learning accelerator system including one or more accelerator clusters including a plurality of non-uniformly distributed memory nodes and a plurality of compute nodes connected by a high speed chip-to-chip interconnect that facilitates transfer of machine learning models or data, the non-uniformly distributed memory nodes having varying capacities or latencies, the operations comprising:
determining memory nodes of the plurality of memory nodes constitute slower memory nodes based on a latency threshold for the non-uniformly distributed memory nodes;
keeping, by the one or more processors, a portion of the machine learning models or data uncompressed in faster memory nodes of the plurality of memory nodes and a portion of the machine learning models or data compressed in the slower memory nodes of the plurality of memory nodes; and
prefetching the machine learning models or data from the slower memory nodes to on-chip memory in the compute nodes via the high speed interconnect.

18. The non-transitory computer readable medium of claim 17, wherein the operations further comprise:
determining memory nodes of the plurality of memory nodes constitute remote memory nodes based on locations of the memory nodes within the one or more accelerator clusters; and
prefetching the machine learning models or data from the remote memory nodes to the on-chip memory in the compute nodes via the high speed interconnect.

19. The non-transitory computer readable medium of claim 17, wherein the operations further comprise:
determining a hotness of the machine learning models or data based on at least one of recency or frequency of use; and swapping the machine learning models or data between memory nodes of the plurality of memory nodes based on the hotness of the machine learning models or data.

20. The non-transitory computer readable medium of claim 17, wherein the operations further comprise:
    determining additional machine learning models or data are needed to perform a computation; and
    decompressing the additional machine learning models or data from the slower memory nodes of the plurality of memory nodes.

* * * * *